United States Patent
Shitamichi et al.

(10) Patent No.: US 10,418,797 B2
(45) Date of Patent: Sep. 17, 2019

(54) WIRE HARNESS PROTECTOR

(71) Applicant: SUMITOMO WIRING SYSTEMS, LTD., Mie (JP)

(72) Inventors: Masaru Shitamichi, Mie (JP); Keisuke Kurihara, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 0 days.

(21) Appl. No.: 15/959,830

(22) Filed: Apr. 23, 2018

(65) Prior Publication Data
US 2018/0316166 A1 Nov. 1, 2018

(30) Foreign Application Priority Data

Apr. 28, 2017 (JP) ................................ 2017-089429

(51) Int. Cl.
*H01B 7/00* (2006.01)
*H02G 3/04* (2006.01)
*H02G 3/34* (2006.01)

(52) U.S. Cl.
CPC ......... *H02G 3/0437* (2013.01); *H02G 3/0418* (2013.01); *H01B 7/0045* (2013.01); *H02G 3/045* (2013.01); *H02G 3/34* (2013.01)

(58) Field of Classification Search
CPC .. H01B 7/0045; H02G 3/0418; H02G 3/0437; H02G 3/045; H02G 3/34
See application file for complete search history.

(56) References Cited

U.S. PATENT DOCUMENTS

| 5,332,866 A * | 7/1994 | Sawamura | H02G 3/0608 138/166 |
| 7,772,491 B2 * | 8/2010 | Ito | H05K 5/0013 174/68.1 |
| 2014/0102744 A1 * | 4/2014 | Suenaga | H02G 3/0418 174/50 |
| 2014/0144698 A1 * | 5/2014 | Sato | H02G 3/0481 174/72 A |
| 2018/0233887 A1 * | 8/2018 | Suzuki | H02G 3/0456 |
| 2018/0361959 A1 * | 12/2018 | Toyosaka | B60R 16/0215 |

FOREIGN PATENT DOCUMENTS

| JP | 11-150832 | 6/1999 |
| JP | 2014110722 | * 6/2014 |

* cited by examiner

*Primary Examiner* — Yuriy Semenenko
(74) *Attorney, Agent, or Firm* — Greenblum & Bernstein, P.L.C.

(57) ABSTRACT

A wire harness protector includes a bottom panel, a first side panel rising from one edge of the bottom panel, and a second side panel rising from another edge of the bottom panel. The bottom panel, first side panel, and second side panel demarcate an accommodation route that accommodates a main line of a wire harness. The first side panel is provided with a notch through which a branch line that branches from the main line is drawn out to an exterior of the accommodation route. A surface of the first side panel that faces the accommodation route is a route forming surface, and a projecting portion projects from the route forming surface.

8 Claims, 6 Drawing Sheets

40: Accommodation route
42: Bottom panel
44: First side panel
44a: Route formation surface
45: Notch
46: Second side panel
70: Projecting portion
100: Main line
110: Branch line

WIRE HARNESS PROTECTOR

CROSS-REFERENCE TO RELATED APPLICATIONS

The present application claims priority under 35 U.S.C. § 119 of Japanese Application No. 2017-089429, filed on Apr. 28, 2017, the disclosure of which is expressly incorporated by reference herein in its entirety.

BACKGROUND OF THE INVENTION

1. Field of the Invention

The present invention relates to a wire harness protector.

2. Description of Related Art

A protector main body of a wire harness protector disclosed in Japanese Patent Laid-open Publication No. H11-150832 includes a bottom panel and a pair of side panels rising from edges of the bottom panel. The bottom panel and pair of side panels demarcate an accommodation route where a main line of a wire harness is accommodated. In addition, a notch is provided in a portion of a side panel of the protector main body. A branch line that branches from the main line is drawn through the notch to an exterior of the accommodation route.

In the wire harness protector disclosed in Japanese Patent Laid-open Publication No. H11-150832, the branch line drawn out of the accommodation route through the notch may be bent so as to rise upward relative to the bottom panel of the protector main body. However, due to the positional relationship between the main line in the accommodation route and the side panel of the protector main body, the main line may interfere with the bending branch line such that the branch line cannot bend to a predetermined position, or an excessive strain may be placed on the branch line. Accordingly, a structure for wire harness protectors is desired in which a main line does not interfere with a branch line when the branch line is bent.

SUMMARY OF THE INVENTION

A wire harness protector resolving the above-noted issue includes a bottom panel, a first side panel rising from one edge of the bottom panel, and a second side panel rising from another edge of the bottom panel. The bottom panel, first side panel, and second side panel demarcate an accommodation route that accommodates a main line of a wire harness. The first side panel is provided with a notch through which a branch line that branches from the main line is drawn out to an exterior of the accommodation route. A surface of the first side panel that faces the accommodation route is a route forming surface, and a projecting portion projects from the route forming surface.

With this configuration, the projecting portion can arrange the main line accommodated in the accommodation route at a position away from the route forming surface of the first side panel. Therefore, a suitable space can be secured between the main line and the route forming surface of the first side panel, which is provided with the notch. Accordingly, even when a branch line drawn out through the notch in the first side panel is bent so as to rise upward relative to the bottom panel, the branch line and the main line are unlikely to interfere with each other. As a result, the branch line can be bent without difficulty and an excessive strain is not applied to the bending branch line.

In the wire harness protector, the projecting portion preferably includes an inclined surface on an opposite side from the notch in an extension direction of the first side panel, the inclined surface inclining so as to grow more distant from the route forming surface as the inclined surface progresses toward the notch.

The main line drawn out to the exterior of the accommodation route of the wire harness protector is connected to another member. Therefore, there is a high probability that movement of the main line is constrained on the opposite side from the notch in the extension direction of the first side panel, i.e., as the main line approaches a main line outlet side. Thus, when the projecting portion comes into direct contact with the main line, the projecting portion and the main line are brought into forceful contact with each other at a location on the opposite side of the projecting portion from the notch.

In the configuration described above, the inclined surface is provided on the opposite side of the projecting portion from the notch, and therefore can bring the surfaces of the main line and the projecting portion into contact. Accordingly, even when the location on the opposite side of the projecting portion from the notch is brought into forceful contact with the main line, damage to the main line can be inhibited.

The wire harness protector is preferably a molded resin article, and the projecting portion preferably extends in a rising direction of the first side panel and is preferably hollow. With this configuration, by making the projecting portion hollow, a wall thickness of the projecting portion can be made thinner relative to the amount by which the projecting portion projects from the first side panel. By reducing the wall thickness of the projecting portion in this way, shrinkage of the projecting portion during manufacture of the wire harness protector can be inhibited.

In the wire harness protector, the notch is preferably positioned away from the center of the first side panel and toward one side in the extension direction of the first side panel. The projecting portion is preferably positioned between the notch and an end portion on the one side of the first side panel.

As noted above, for a main line accommodated in the accommodation route of the wire harness protector, there is a high probability that the movement of the main line is constrained as the main line approaches the outlet side of the accommodation route. Conversely, at a position away from the outlet side, within the accommodation route, the main line may move comparatively readily, and the main line may have greater freedom to move at a position away from the route forming surface of the first side panel.

In the configuration described above, the notch is arranged closer to one side of the first side panel. Therefore, being closer to the one side than the notch of the first side panel, the main line is less likely to move. Providing the projecting portion to such a location and securing a separation distance between the main line and the route forming surface of the first side panel is particularly effective.

In the wire harness protector, the projecting portion is preferably formed along the entire rising direction of the first side panel on the route forming surface. With this configuration, a height range over which the projecting portion can make contact with the main line is the entire height of the first side panel. Therefore, the projecting portion can reliably make direct contact with the main line and can secure a space between the main line and the route forming surface of the first side panel regardless of the diameter or shape of the main line to be accommodated in the accommodation route.

According to the present invention, a branch line that extends to an exterior of an accommodation route of a wire harness protector and a main line are unlikely to interfere with each other when the branch line is bent.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
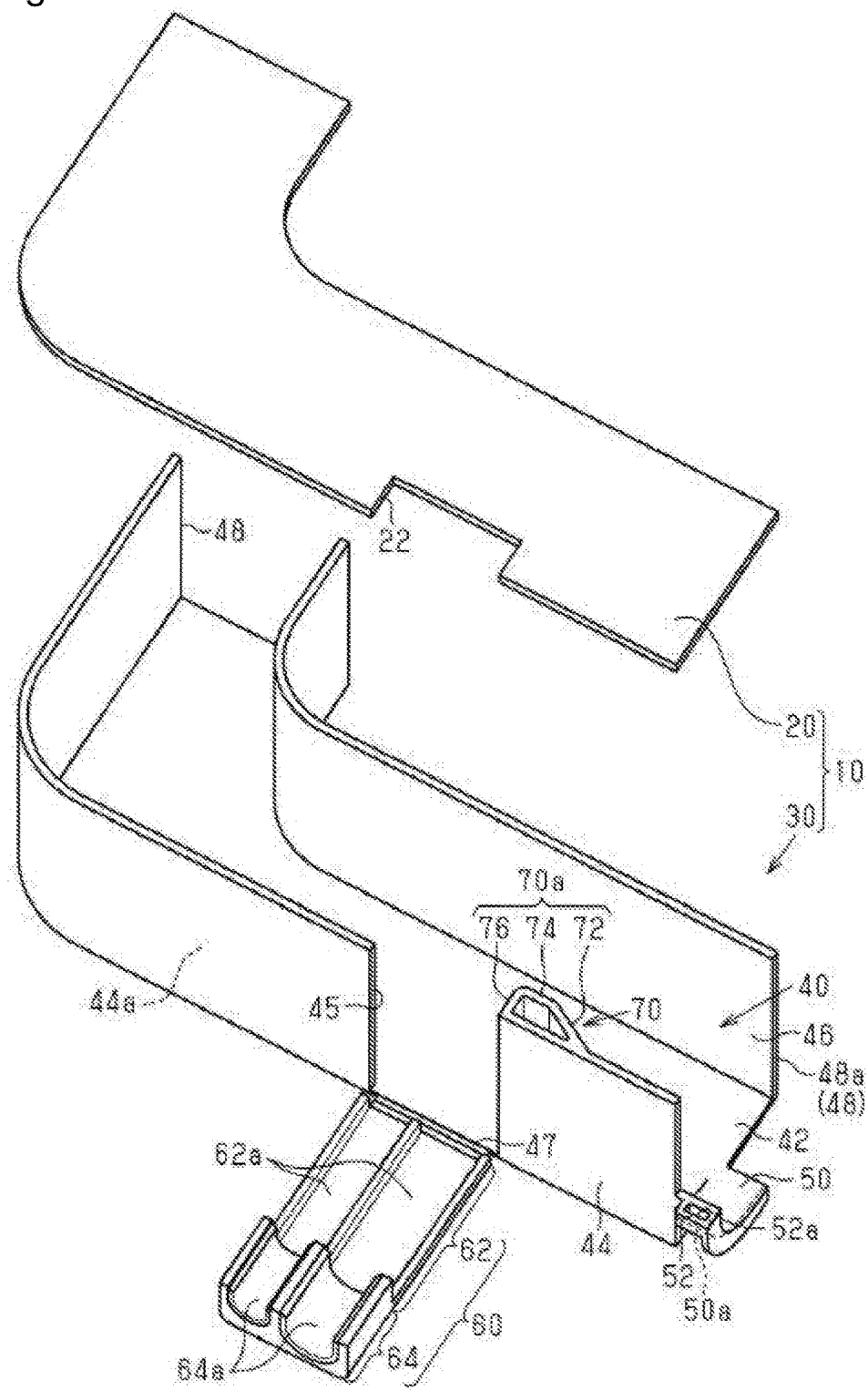
FIG. 1 is an exploded perspective view of a wire harness protector.

Hereafter, an embodiment of a wire harness protector is described with reference to FIGS. 1 to 5. As illustrated in FIG. 1, a wire harness protector 10 includes a protector main body 30 and a lid 20 that covers the protector main body 30 from above. The protector main body 30 and the lid 20 are both molded resin articles.

Figure 2:
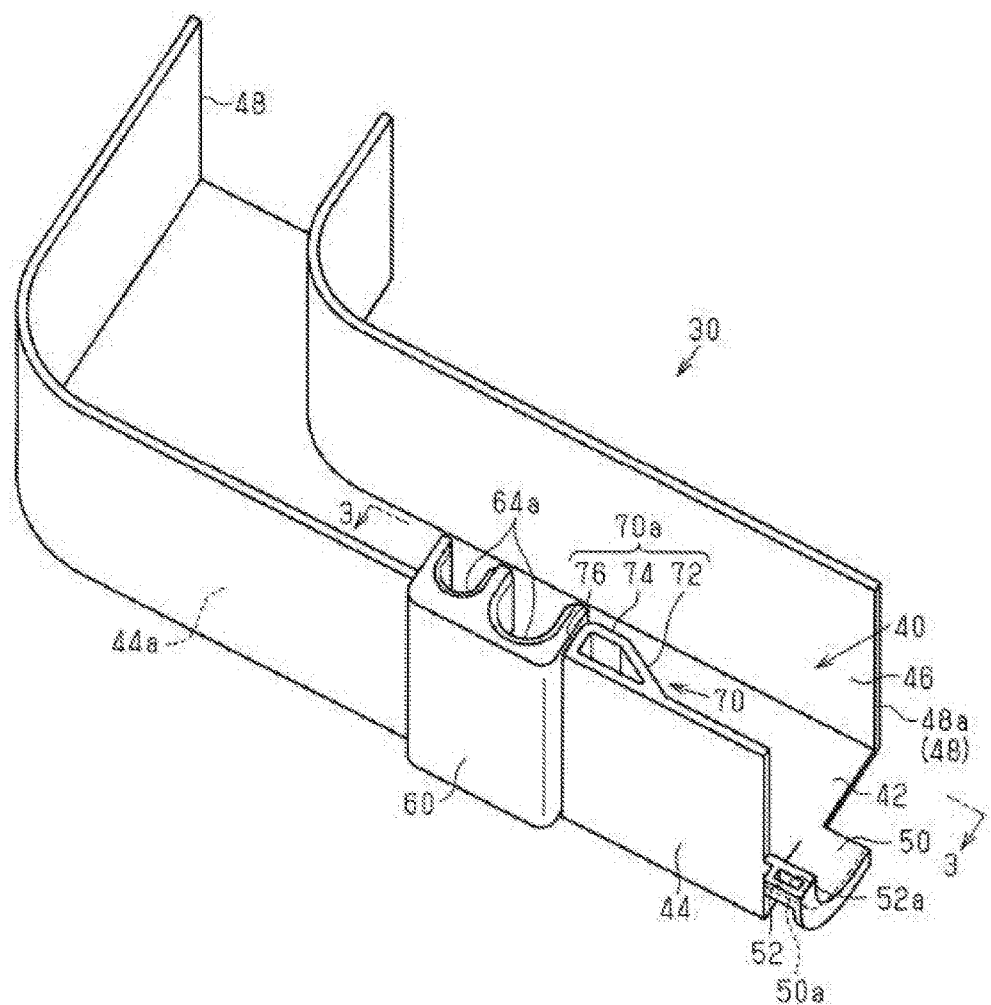
FIG. 2 is a perspective view of a protector main body in a state where a branch line retainer piece is closed.
Figure 3:
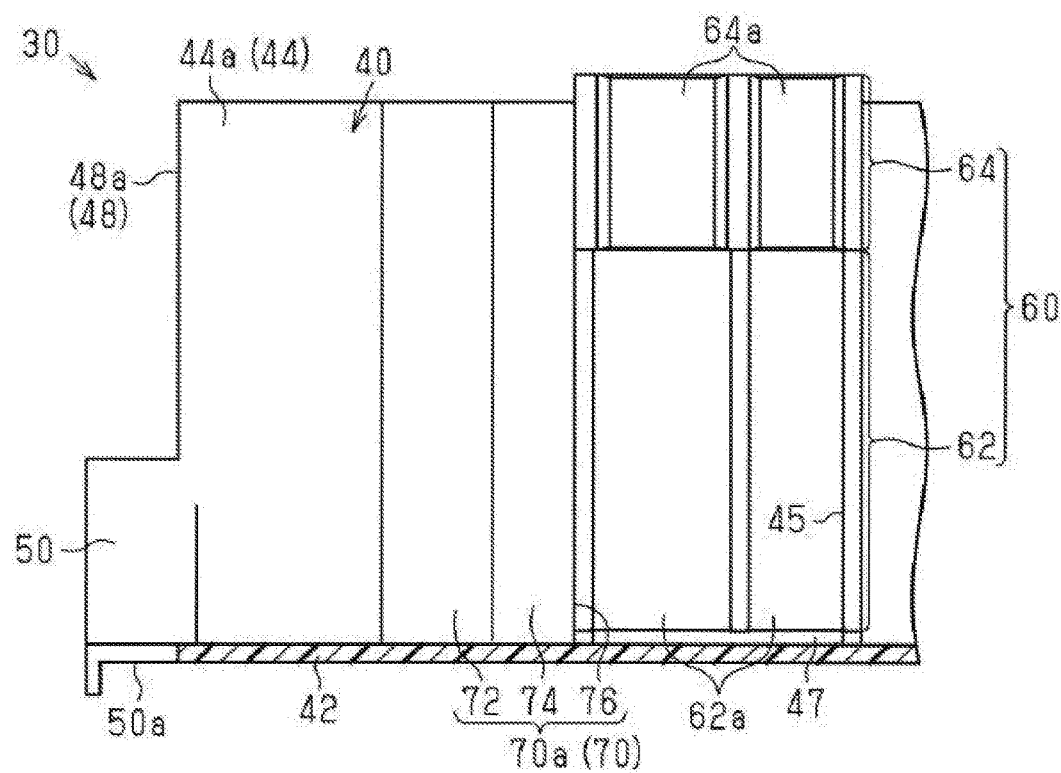
FIG. 3 is a cross-sectional view along an arrow line 3-3 in FIG. 2.

As illustrated in FIGS. 1 to 3, the protector main body 30 includes a plate-shaped bottom panel 42. The bottom panel 42 extends in substantially an "L" shape in plan view. A plate-shaped first side panel 44 rises upward from an outside edge of the "L" of the bottom panel 42. The first side panel 44 extends along substantially the entire outside edge of the "L" of the bottom panel 42. A plate-shaped second side panel 46 rises upward from an inside edge of the "L" of the bottom panel 42. The second side panel 46 extends along the entire inside edge of the "L" of the bottom panel 42. A rising length of the second side panel 46 measured from the bottom panel 42 is the same as the rising length of the first side panel 44 measured from the bottom panel 42. In the protector main body 30, an accommodation route 40 is demarcated by the bottom panel 42, the first side panel 44, and the second side panel 46. The accommodation route 40 is open at the top. Furthermore, in the protector main body 30, the accommodation route 40 is open at both ends of the "L" of the bottom panel 42, and an opening 48 at each of the two ends is a main line outlet through which a main line 100 that is accommodated in the accommodation route 40 is drawn out to an exterior.

As illustrated in FIGS. 1 and 3, a notch 45 is cut out of the first side panel 44, the cut oriented downward from a top end of the first side panel 44. The notch 45 has substantially a rectangular shape, and a bottom end of the notch 45 is cut all the way to the bottom panel 42. Specifically, the notch 45 has a shape such that the first side panel 44 is cut away across the entire vertical direction in a rectangular shape. The notch 45 is positioned away from the center of the first side panel 44 and toward one end portion (toward the opening 48) in an extension direction of the L-shaped first side panel 44. Hereafter, the one opening 48 is referred to as a notch-side opening 48a.

As illustrated in FIGS. 1 and 3, a branch line retainer piece 60 is connected, via a thin-walled portion 47, to the outside edge of the "L" of the bottom panel 42 at a position corresponding to the bottom end of the notch 45. The branch line retainer piece 60 has an overall rectangular plate shape. A dimension of the branch line retainer piece 60 in a direction that follows the outside edge of the "L" of the bottom panel 42 (in this embodiment, a short-direction dimension) is substantially similar to a dimension of the notch 45 in the direction that follows the outside edge of the "L" of the bottom panel 42. In addition, an extension length of the branch line retainer piece 60 from the bottom panel 42 (in this embodiment, a long-direction length) is longer than a rising dimension of the first side panel 44. The thin-walled portion 47 is less thick and has less flex strength than the bottom panel 42 and the branch line retainer piece 60. Specifically, the thin-walled portion 47 acts as a hinge causing the branch line retainer piece 60 to rotate relative to the outside edge of the "L" of the bottom panel 42.

Figure 5:
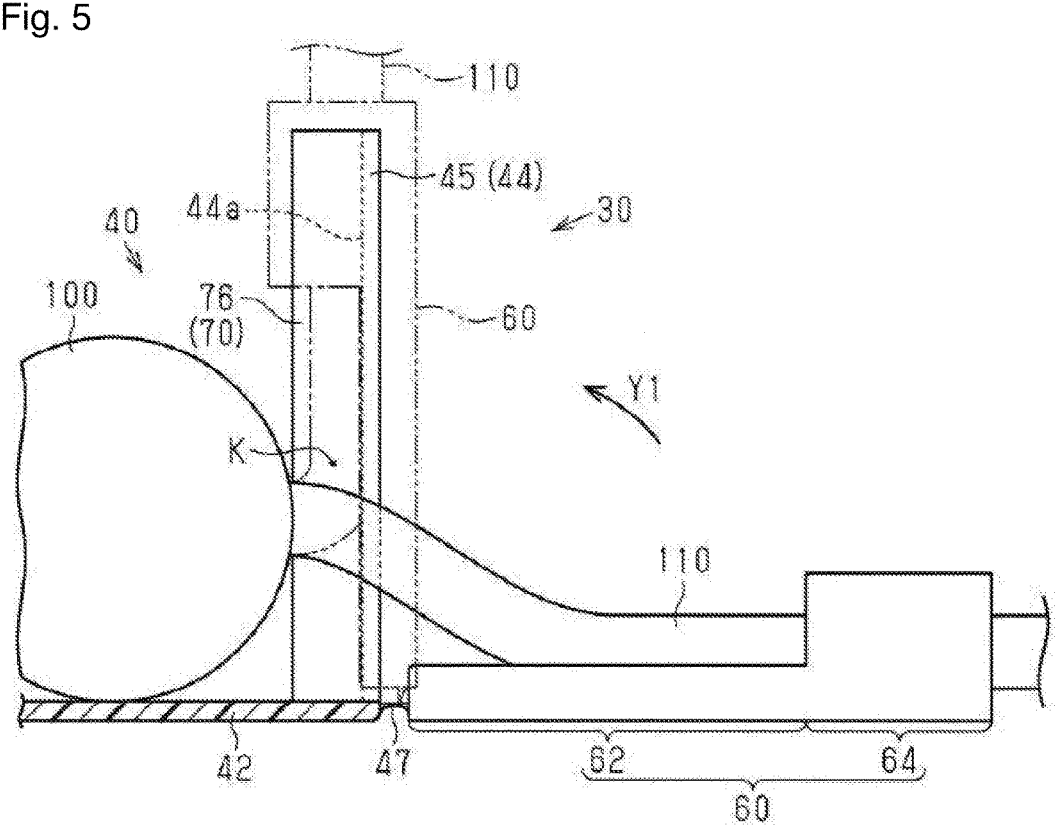
FIG. 5 is a cross-sectional view along an arrow line 5-5 in FIG. 4.

As illustrated in FIGS. 1 and 5, the branch line retainer piece 60 is formed in a plate shape having different thicknesses on one long-direction side and the other long-direction side. A portion toward a base end (the side connected to the bottom panel 42) of the branch line retainer piece 60 is a thin plate portion 62 having a reduced thickness. A portion toward a foremost end (the opposite side from the base end side) of the branch line retainer piece 60 is a thick plate portion 64 having an increased thickness. The thin plate portion 62 and the thick plate portion 64 occupy the same plane on a reverse surface side thereof (a downward surface in a state where the branch line retainer piece 60 is opened outward relative to the accommodation route 40), and have different heights on a front surface side thereof. The front surface side of the thin plate portion 62 and the thick plate portion 64 is a surface oriented toward the accommodation route 40 when the branch line retainer piece 60 is lifted into a position closing off the notch 45.

As illustrated in FIG. 1, two shallow channels 62a are formed on the front surface side of the thin plate portion 62, the shallow channels 62a being channels that are recessed in a thickness direction of the thin plate portion 62. The shallow channels 62a are aligned in the short direction of the branch line retainer piece 60 and run the full length of the thin plate portion 62.

Two deep channels 64a are formed on the front surface side of the thick plate portion 64, the deep channels 64a being channels that are recessed in a "U" shape in the thickness direction of the thick plate portion 64. The deep channels 64a are each formed in line with the respective shallow channel 62a of the thin plate portion 62, and run the full length of the thick plate portion 64. The deep channels 64a are deeper than the shallow channels 62a.

As illustrated in FIG. 1, the protector main body 30 includes a main line fixation portion 50 that projects in the extension direction of the first side panel 44 from a bottom corner on the first side panel 44 side of the notch-side opening 48a. The main line fixation portion 50 has a curved shape that rounds the bottom corner noted above, and extends from a bottom portion of the first side panel 44 and along a portion of the bottom panel 42 on the first side panel 44 side. A band attachment portion 52 that juts outward is formed on a top end of a curved outer surface 50a of the main line fixation portion 50. A through-hole 52a runs through the band attachment portion 52 in the vertical direction.

As illustrated in FIGS. 1 to 3, a projecting portion 70 projects toward the second side panel 46 from a route forming surface 44a, which is a surface of the first side panel 44 facing the accommodation route 40. The projecting portion 70 projects from the route forming surface 44a of the first side panel 44 at a location between the notch-side opening 48a and the notch 45. In the present embodiment, the projecting portion 70 is particularly positioned at a location along an edge of the notch 45.

The projecting portion 70 has a hollow shape with an empty space between the projecting portion 70 and the route forming surface 44a of the first side panel 44. In other words, the projecting portion 70 forms a tubular shape with a portion of the first side panel 44, the tubular shape rising in the vertical direction of the first side panel 44. The projecting portion 70 is open at a top end. In addition, the projecting portion 70 is formed along the entire vertical direction of the first side panel 44. The wall thickness of the projecting portion 70 is substantially constant across the entirety thereof.

As illustrated in FIG. 1, an outer circumferential surface 70a (surface facing the accommodation route 40) of the projecting portion 70 is composed of an inclined surface 72, a parallel surface 74, and an orthogonal surface 76 in that order in the extension direction of the first side panel 44, from the notch-side opening 48a side toward the notch 45 side. The inclined surface 72 is continuous with the route forming surface 44a and is inclined so as to grow more distant from the route forming surface 44a as the inclined surface 72 progresses toward the notch 45 in the extension direction of the first side panel 44. The parallel surface 74 continues in the extension direction of the first side panel 44 from the notch 45-side end portion of the inclined surface 72 toward the notch 45. The parallel surface 74 is arranged so as to be parallel to the route forming surface 44a, and at a position away from the route forming surface 44a and toward the second side panel 46. The orthogonal surface 76 continues from the notch 45-side end portion of the parallel surface 74 toward the first side panel 44, and links with the edge of the notch 45 on the first side panel 44. The orthogonal surface 76 is perpendicular to the route forming surface 44a. With these shapes, the projecting portion 70 forms a substantially trapezoidal tubular shape with a portion of the first side panel 44. The projecting portion 70 is integrally molded with the bottom panel 42, the first side panel 44, and the second side panel 46.

A plate-shaped lid 20 is attached to the top side of the protector main body 30 having the configuration described above. In plan view, the lid 20 has substantially an "L" shape that is substantially identical to the bottom panel 42 of the protector main body 30. A rectangular notch 22 is cut inward from an outside edge of the "L" of the lid 20. When the lid 20 is attached to the protector main body 30, the notch 22 is positioned at a location that corresponds to the notch 45 on the protector main body 30. In other words, in a state where the lid 20 is attached to the protector main body 30, the branch line retainer piece 60 does not interfere with the lid 20 even when the branch line retainer piece 60 is lifted into a position closing off the notch 45.

Figure 4:
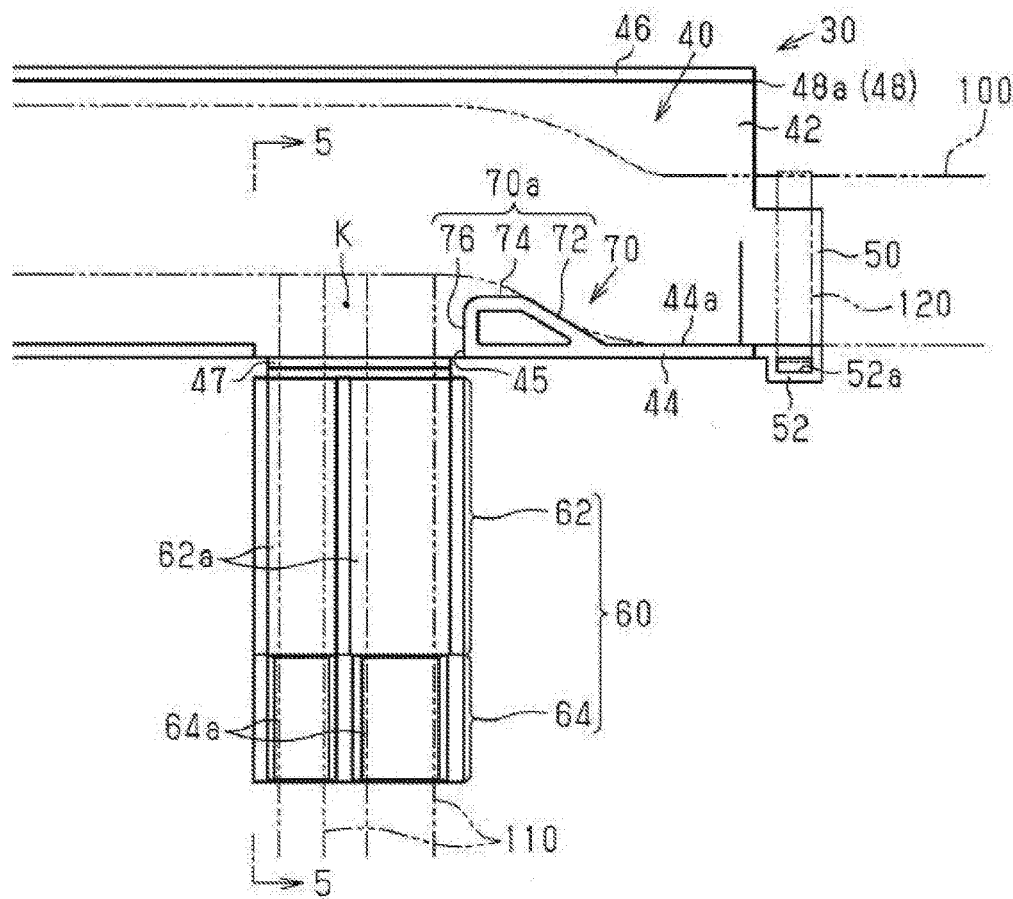
FIG. 4 is a top view of the protector main body while accommodating a main line and branch line.

Next, a procedure for accommodating the main line 100 and a branch line 110 in the protector main body 30 is described. First, as illustrated in FIG. 4, the branch line retainer piece 60 is opened from the accommodation route 40 to the exterior. Then, the main line 100 is accommodated in the accommodation route 40 in a state extending along the extension direction of the first side panel 44 and the second side panel 46. The branch line 110 is drawn through the notch 45 to the exterior of the accommodation route 40 and is arranged on the shallow channels 62a and deep channels 64a of the branch line retainer piece 60.

Then, a fastening band 120 is inserted through the through-hole 52a in the band attachment portion 52 of the main line fixation portion 50, and the fastening band 120 is wrapped around the outer surface 50a of the main line fixation portion 50 and the outer circumferential surface of the main line 100. Then, as indicated by an arrow Y1 in FIG. 5, the branch line retainer piece 60 is lifted in a direction closing the notch 45, with rotation centered on the thin-walled portion 47. This bends the branch line 110 such that the branch line 110 rises with respect to the bottom panel 42 of the protector main body 30.

Next, effects of the present embodiment are described.
(1) The main line fixation portion 50 projects from the bottom corner on the first side panel 44 side of the notch-side opening 48a. Therefore, when the fastening band 120 is wrapped around the main line fixation portion 50 and the main line 100 in the accommodation procedure described above, the main line 100 is constrained on a top surface of the bottom panel 42 in a state pressed against the route forming surface 44a of the first side panel 44.

Figure 6:
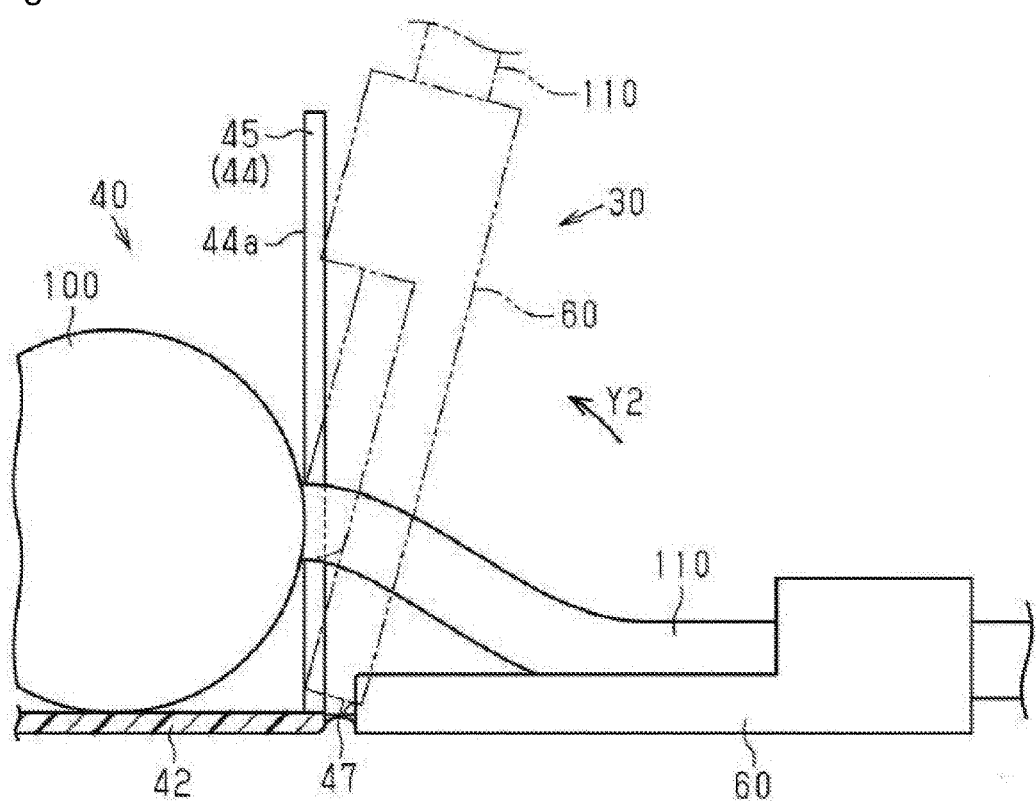
FIG. 6 is a cross-sectional view of the protector main body without a projecting portion.

Here, an example is proposed where the route forming surface 44a of the protector main body 30 is not provided with the projecting portion 70. In such a case, as illustrated in FIG. 6, when the fastening band 120 is wrapped around the main line fixation portion 50 and fixates the main line 100, the main line 100 is in a state extending in the extension direction of the first side panel 44 while maintaining a position where the main line 100 touches the route forming surface 44a. Therefore, as illustrated in FIG. 6, if there is any space at all between the main line 100 and the notch 45, such space is extremely small. Accordingly, when the branch line retainer piece 60 is lifted in the direction closing the notch 45, as illustrated by an arrow Y2, the branch line 110 is bent upward at a position protruding outside the accommodation route 40 through the notch 45, as illustrated by the two dot dashed line in FIG. 6. In order to lift the branch line retainer piece 60 past the position indicated by the two dot dashed line in FIG. 6 and achieve a state where the branch line 110 stands upright, the branch line 110 which protrudes outside the accommodation route 40 through the notch 45 must be forced back into the accommodation route 40 and stood upright, which applies significant strain to the branch line 110.

In contrast, in the wire harness protector 10 according to the embodiment described above, in which the projecting portion 70 is provided to the route forming surface 44a, a branch line 110 bending space K can be secured between the main line 100 and the notch 45 as described below, and therefore the branch line retainer piece 60 can be lifted without applying strain to the branch line 110.

Specifically, as illustrated in FIG. 4, when the fastening band 120 is wrapped around the main line fixation portion 50 and the main line 100, the main line 100 is fixated in the following extended state. Between the notch-side opening 48a and the projecting portion 70, the main line 100 is in direct contact with the route forming surface 44a. At a position corresponding to the inclined surface 72 of the projecting portion 70, the main line 100 is gradually guided to a position away from the route forming surface 44a due to the main line 100 being in direct contact with the inclined surface 72. In addition, on the opposite side of the projecting portion 70 from the notch-side opening 48a, the main line 100 extends in the extension direction of the first side panel 44 while maintaining the position away from the route forming surface 44a. Accordingly, the bending space K where the branch line 110 is bent upward is secured between the notch 45 and the main line 100. Therefore, when the branch line retainer piece 60 is lifted in the direction closing the notch 45 as indicated by the arrow Y1 in FIG. 5, the branch line 110 can be bent upward without difficulty. In addition, the branch line retainer piece 60 can be lifted to the position closing the notch 45 without applying an excessive strain to the bent branch line 110.

(2) The main line 100 is constrained on the side of the notch-side opening 48a, on the opposite side of the projecting portion 70 from the notch 45. Accordingly, the main line 100 is brought into forceful contact with the projecting portion 70 on the notch-side opening 48a side of the projecting portion 70. In the embodiment described above, the end portion of the projecting portion 70 on the notch-side opening 48a side, where the main line 100 is in forceful contact, is the inclined surface 72. Therefore, the surfaces of the main line 100 and the projecting portion 70 can be brought into contact. Accordingly, even when the main line 100 is in forceful contact with the inclined surface 72 of the projecting portion 70, damage to the main line 100 is inhibited.

(3) The projecting portion 70 has a hollow shape. Therefore, the wall thickness of the projecting portion 70 can be made thinner relative to the amount by which the projecting portion 70 projects from the route forming surface 44a. By reducing the wall thickness of the projecting portion 70 in this way, shrinkage of the projecting portion 70 during manufacture can be inhibited. In addition, when the projecting portion 70 is integrally formed with the first side panel 44 as in the above-described embodiment, shrinkage of the first side panel 44 may occur when the projecting portion 70 has significant wall thickness. When there is shrinkage of the first side panel 44, not only is the appearance negatively impacted, but accuracy in attaching the first side panel 44 to other components is also likely to be reduced. From a perspective of inhibiting such shrinkage of the first side panel 44, giving the projecting portion 70 a hollow shape is preferred.

(4) When the fastening band 120 is wrapped around the main line fixation portion 50 and the main line 100 and movement of the main line 100 is constrained, the constraining force is easier to maintain the closer the distance to the main line fixation portion 50. Conversely, the constraining force grows weaker the farther the distance from the main line fixation portion 50. Accordingly, the main line 100 has greater freedom to move the farther the distance from the main line fixation portion 50.

In the embodiment described above, of the two extension-direction ends of the first side panel 44, the notch 45 is arranged closer to the end portion where the main line fixation portion 50 is provided (the notch-side opening 48a). Therefore, for positions leading up to the notch 45, the constraining force on the main line 100 is more likely to be maintained and the main line 100 is less likely to move to a position away from the route forming surface 44a as compared to a case where the notch 45 is, for example, arranged closer to the opposite side of the extension-direction center of the first side panel 44 from the notch-side opening 48a. In cases such as that of the embodiment described above, by providing the projecting portion 70 between the notch 45 and the end portion where the main line fixation portion 50 is provided (notch-side opening 48a), the main line 100 can be effectively arranged at a position away from the route forming surface 44a.

(5) The projecting portion 70 is formed along the entire vertical direction of the route forming surface 44a. Therefore, a height range over which the projecting portion 70 can make contact with the main line 100 is the entire height of the first side panel 44. Therefore, the projecting portion 70 can reliably make direct contact with the main line 100 and can secure a space between the route forming surface 44a and the main line 100 regardless of the diameter or shape of the main line 100 to be accommodated in the accommodation route 40.

The embodiment described above can also be modified as follows.

The projecting portion 70 according to the embodiment described above can be modified as appropriate, so long as the shape of the projecting portion 70 is capable of disposing the main line 100 at a position away from the route forming surface 44a. The shape of the projecting portion 70 is preferably a shape such as an arc, for example, that is capable of inhibiting contact between the main line 100 and a corner.

In the embodiment described above, the top end of the projecting portion 70 is open. However, the projecting portion 70 may also have a closed top end and simply have a hollow interior.

In the embodiment described above, the projecting portion 70 is hollow. However, the projecting portion may also have a solid shape. In particular, when the projecting portion 70 projects to a degree that shrinkage does not occur during molding, for example, the projecting portion 70 being solid does not lead to any issues.

The projecting portion 70 according to the embodiment described above does not need to be formed along the entire height direction of the first side panel 44, and may instead be formed on only a portion of the height direction of the first side panel 44. For example, when the diameter of the main line 100 to be accommodated in the accommodation route 40 is known ahead of time, the projecting portion 70 can make contact with the main line 100 and can arrange the main line 100 in a position away from the route forming surface 44a so long as the projecting portion 70 is formed at a height position that at least matches a center axis line of the main line 100 when the main line 100 is accommodated in the accommodation route 40. In this way, so long as the projecting portion 70 can make contact with the main 100 line and arrange the main line 100 away from the route forming surface 44a, a formation position of the projecting portion 70 in the height direction of the first side panel 44 can be modified as appropriate in response to the diameter, shape, or the like of the main line 100.

A positional relationship between the projecting portion 70 and the notch 45 is not limited to that described in the embodiment above. For example, the projecting portion 70 may instead be arranged on the opposite side of the notch 45 from the notch-side opening 48*a* in the extension direction of the first side panel 44. When the projecting portion 70 is arranged on the opposite side of the notch 45 from the notch-side opening 48*a*, the projecting portion 70 is preferably formed at a location on the route forming surface 44*a* that is in a line with the notch 45 relative to the extension direction of the first side panel 44. By arranging the projecting portion 70 at such a location, the branch line 110 bending space K is more readily secured between the notch 45 and the main line 100.

In addition, the present invention is not limited to providing only one projecting portion 70, but may instead provide a plurality of projecting portions 70. For example, one projecting portion 70 may be provided on each of two sides of the notch 45 in the extension direction of the first side panel 44.

Rather than integrally molding the projecting portion 70 with the bottom panel 42, the first side panel 44, and the second side panel 46, the projecting portion 70 may instead be molded separately as an independent component and be attached to the first side panel 44 at a later time.

A portion of the branch line 110 that branches from the main line 100 may extend within the accommodation route 40 of the protector main body 30. Specifically, the branch line 110 may branch from the main line 100 at a location away from the notch 45 of the protector main body 30, and may be accommodated in the accommodation route 40 from that branching location up until the notch 45. In such a case, the projecting portion 70 is preferably provided at a position that does not make contact with the branch line 110 as the branch line 110 extends through the accommodation route 40.

In the embodiment described above, the notch 45 is arranged closer to the end portion of the first side panel 44 having the notch-side opening 48*a*. However, the notch 45 may also be arranged closer to the opposite end portion of the first side panel 44 from the end portion having the notch-side opening 48*a*. The notch 45 may also be arranged at the extension-direction center of the first side panel 44.

So long as the notch 45 is cut from the top end of the first side panel 44 and the branch line 110 can be drawn out from the accommodation route 40, the shape of the notch 45 can be modified from that described in the embodiment above. For example, the notch 45 may instead not reach the bottom end of the first side panel 44. The shape of the branch line retainer piece 60 should be modified in accordance with the shape of the notch 45 so as to be able to open and close the notch 45.

So long as the branch line retainer piece 60 can hold the branch line 110, the shape of the branch line retainer piece 60 can be modified from that described in the embodiment above.

The configuration enabling the branch line retainer piece 60 to rotate is not limited to the thin-walled portion 47. For example, the branch line retainer piece 60 may be connected to a position corresponding to the bottom end portion of the notch 45 by the axial support of a rotating shaft. Moreover, the branch line retainer piece 60 may be omitted and the branch line 110 may be bent directly.

So long as the bottom panel 42, the first side panel 44, and the second side panel 46 can demarcate the accommodation route 40 that accommodates the main line 100, and the projecting portion 70 can be provided so as to fulfill a similar function to that described in the embodiment above, the shapes of these components can be modified as appropriate from those described in the embodiment above.

So long as the main line fixation portion 50 can constrain the main line 100 in a state pressed against the route forming surface 44*a* by having the fastening band 120 wrapped around the main line fixation portion 50 and the main line 100, the shape of the main line fixation portion 50 can be modified as appropriate from that described in the embodiment above.

In addition, the main line fixation portion 50 and the fastening band 120 may be omitted. Even when the fastening band 120 is omitted, the main line 100 that is drawn out of the accommodation route 40 through the notch-side opening 48*a* is connected and fixated to some other member. Therefore, even when not fixated by the fastening band 120, there is a high probability that the movement of the main line 100 is constrained as the main line 100 approaches the notch-side opening 48*a*.

The embodiment above does not require the lid 20. So long as the main line 100 accommodated within the accommodation route 40 is unlikely to stick out, the lid 20 may be omitted without adverse effect.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A wire harness protector includes a bottom panel, a first side panel rising from one edge of the bottom panel, and a second side panel rising from another edge of the bottom panel, the bottom panel, first side panel, and second side panel demarcating an accommodation route that accommodates a main line of a wire harness, wherein the first side panel is provided with a notch through which a branch line that branches from the main line is drawn out to an exterior of the accommodation route, and a surface of the first side panel that faces the accommodation route is a route forming surface, and a projecting portion projects from the route forming surface along an edge of the notch.

2. The wire harness protector according to claim 1 wherein the projecting portion includes an inclined surface on an opposite side from the notch in an extension direction of the first side panel, the inclined surface inclining so as to increase in distance from the route forming surface as the inclined surface progresses toward the notch.

3. The wire harness protector according to claim 1 wherein the wire harness protector is a molded resin article, and the projecting portion extends in a vertical direction of the first side panel and is hollow.

4. The wire harness protector according to claim 1 wherein the notch is positioned away from a center of the first side panel and toward one side in an extension direction of the first side panel, and the projecting portion is positioned between the notch and an end portion on the one side of the first side panel.

5. The wire harness protector according to claim 1 wherein the projecting portion is formed along an entire vertical direction of the first side panel on the route forming surface.

6. The wire harness protector according to claim 1, wherein the projecting portion is formed in a tubular shape extending in a vertical direction of the first side panel.

7. The wire harness protector according to claim 1, an outer circumferential surface of the projecting portion comprising an inclined surface inclined to the route forming surface, a parallel surface parallel to the route forming surface, and an orthogonal surface orthogonal to the route forming surface, in order in an extension direction of the first side panel toward the edge of the notch.

8. The wire harness protector according to claim 7, wherein the inclined surface, the parallel surface, and the orthogonal surface form a substantially trapezoidal shape with a portion of the first side panel.

* * * * *